(12) United States Patent
Cocchi et al.

(10) Patent No.: US 11,185,089 B2
(45) Date of Patent: Nov. 30, 2021

(54) CONNECTING KIT AND PRODUCT FEED UNIT COMPRISING THE KIT

(71) Applicant: ALI GROUP S.r.l.-CARPIGIANI, Cernusco Sul Naviglio (IT)

(72) Inventors: Andrea Cocchi, Calderara di Reno (IT); Roberto Lazzarini, Reggio Emilia (IT)

(73) Assignee: ALI GROUP S.R.L.-CARPIGIANI, Cernusco Sul Naviglio (IT)

( * ) Notice: Subject to any disclaimer, the term of this patent is extended or adjusted under 35 U.S.C. 154(b) by 582 days.

(21) Appl. No.: 16/052,284

(22) Filed: Aug. 1, 2018

(65) Prior Publication Data
US 2019/0069574 A1 Mar. 7, 2019

(30) Foreign Application Priority Data
Sep. 7, 2017 (IT) .......................... 102017000100297

(51) Int. Cl.
*F16L 19/02* (2006.01)
*A23G 9/16* (2006.01)
(Continued)

(52) U.S. Cl.
CPC ............... *A23G 9/166* (2013.01); *A23G 9/08* (2013.01); *A23G 9/22* (2013.01); *A23L 3/00* (2013.01);
(Continued)

(58) Field of Classification Search
CPC ........ A23G 9/281; A23G 9/28; F16L 19/0206
(Continued)

(56) References Cited

U.S. PATENT DOCUMENTS 944,877 A * 12/1909 Koschinski ......... F16L 19/0206
285/388
1,016,620 A * 2/1912 Gapp .................. F16L 19/0206
285/388
(Continued)

FOREIGN PATENT DOCUMENTS

CN 1244240 A 2/2000
CN 105795089 A 7/2016
(Continued)

OTHER PUBLICATIONS

Italian Search Report dated Apr. 26, 2018 for counterpart Italian Patent Application No. IT 102017000100297.
(Continued)

*Primary Examiner* — David Bochna
(74) *Attorney, Agent, or Firm* — Shuttleworth & Ingersoll, PLC; Timothy Klima

(57) ABSTRACT

A kit for connecting to a processing container a device for feeding a liquid or semi-liquid food product, including at least: an internally hollow pipe having a first end and a second end, wherein at least one between the first and the second end includes an enlarged, external terminal portion; a receiving element provided with a hole for receiving at least the enlarged, external terminal portion at one end of the pipe and with an abutment for stopping the end of the pipe inside the hole; a pushing portion for pushing and locking the enlarged, external terminal portion at the end inside the receiving hole in order to allow locking the enlarged, external terminal portion against the abutment.

15 Claims, 4 Drawing Sheets

(51) Int. Cl.
*A23G 9/08* (2006.01)
*A23L 3/00* (2006.01)
*A23G 9/22* (2006.01)

(52) U.S. Cl.
CPC ....... *F16L 19/0212* (2013.01); *F16L 19/0237* (2013.01)

(58) Field of Classification Search
USPC .................... 285/388, 387, 389, 354, 386
See application file for complete search history.

(56) References Cited

U.S. PATENT DOCUMENTS

| | | | | |
|---|---|---|---|---|
| 1,186,325 A * | 6/1916 | Metzger | ............... | F16L 15/006 285/388 |
| 1,403,773 A * | 1/1922 | Hanson | ............... | F16L 19/0225 285/354 |
| 1,675,808 A * | 7/1928 | Kliss | ............... | F16L 19/0231 285/388 |
| 1,894,700 A * | 1/1933 | Rue | ............... | F16L 19/046 285/332.1 |
| 2,497,273 A * | 2/1950 | Richardson | ............ | F16L 19/045 285/334.5 |
| 2,669,465 A * | 2/1954 | Newell | ................ | F16L 25/023 285/53 |
| 3,113,792 A * | 12/1963 | Brown | ................ | F16L 19/0231 285/354 |
| 3,640,551 A * | 2/1972 | Shakesby | ............... | F16L 47/04 285/386 |
| 4,676,479 A * | 6/1987 | Ogawa | ................ | F16K 5/0678 251/151 |
| 4,927,185 A | 5/1990 | McNaughton | | |
| 5,340,163 A * | 8/1994 | Merrer | ................ | F16L 19/005 285/354 |
| 6,435,570 B1 * | 8/2002 | Kato | ................... | F16L 19/0283 285/334.5 |
| 6,896,299 B1 * | 5/2005 | Nishio | ................. | F16L 33/223 285/354 |
| 7,000,953 B2 * | 2/2006 | Berghaus | ............ | F16L 19/0218 285/354 |
| 7,331,615 B2 * | 2/2008 | Cheytanov | ............ | F16L 19/025 285/354 |
| 7,883,117 B2 * | 2/2011 | Marc | ..................... | F16L 19/005 285/354 |
| 2003/0011195 A1 * | 1/2003 | Hayes, Jr. | ........... | F16L 19/0231 285/387 |
| 2006/0197342 A1 | 9/2006 | Yen | | |
| 2014/0116552 A1 | 5/2014 | Kury | | |
| 2015/0276134 A1 * | 10/2015 | Cocchi | ..................... | A23G 9/28 222/1 |
| 2015/0308593 A1 * | 10/2015 | Brouwer | ............ | F16L 19/0206 137/315.11 |
| 2020/0352193 A1 * | 11/2020 | Cocchi | ..................... | A23G 9/28 |

FOREIGN PATENT DOCUMENTS

| | | |
|---|---|---|
| CN | 205560045 U | 9/2016 |
| EP | 2181608 A1 | 5/2010 |
| EP | 3045048 A1 | 7/2016 |
| EP | 3100615 A1 | 12/2016 |
| GB | 2254035 A | 9/1992 |
| JP | 2013527392 A | 6/2013 |

OTHER PUBLICATIONS

Chinese Office Action dated Mar. 26, 2021 from counterpart Chinese Patent Application No. 201811037313.9.

* cited by examiner

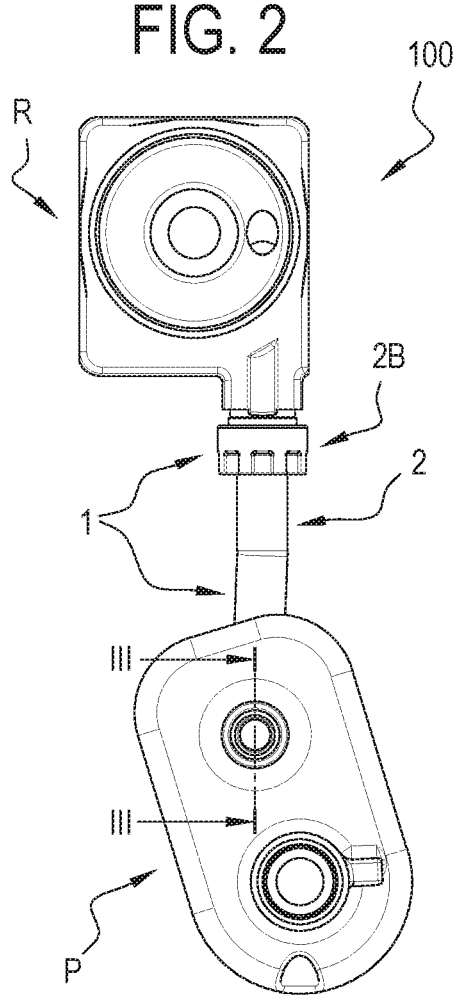
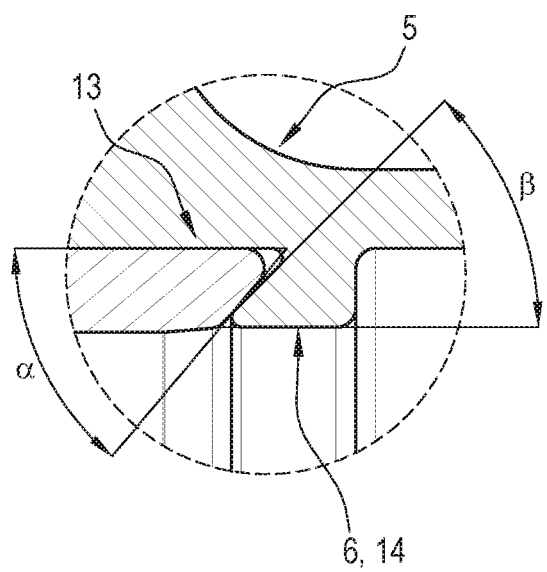
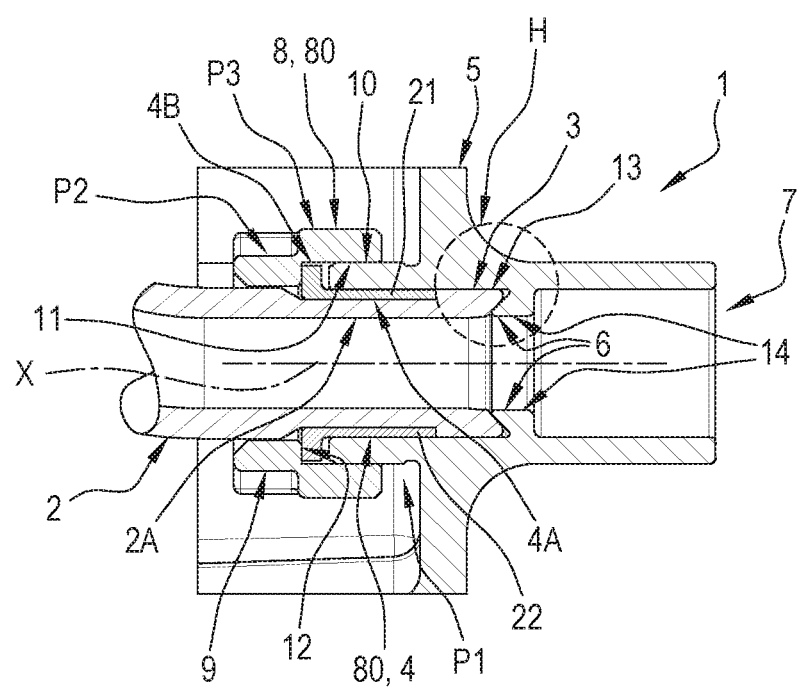

CONNECTING KIT AND PRODUCT FEED UNIT COMPRISING THE KIT

This application claims priority to Italian Patent Application IT102017000100297 filed Sep. 7, 2017, the entirety of which is incorporated by reference herein.

BACKGROUND OF THE INVENTION

This invention relates to a connecting kit and to a product feed unit, specifically applicable to a machine for making liquid and semi-liquid products of the sector of ice cream (gelato, sorbets, soft ice cream, etc.), bakery and confectionery (custard and chocolate creams, etc.) or catering (savory soups, etc.).

As is known, a need which is strongly felt in this sector is that of being able to connect one or more feed components (for example, a pump) to a container quickly and easily while at the same time guaranteeing food safety and fluid tightness under all conditions.

The applicant has found that the presence of a gasket in the components to be connected creates the risk of bacterial contamination: in effect, the operator does not always ensure that the gasket is removed and/or replaced.

A need which is therefore felt particularly strongly by machine manufacturers is that of having a connecting kit to be placed between a feed source or device and a product receiving container without the need for gaskets or any additional sealing elements.

SUMMARY OF THE INVENTION

This invention has for an aim to meet the above mentioned need, that is, to provide a connecting kit and a feed unit which allows connecting one or more components to each other quickly and easily in fluid tight manner, thereby guaranteeing food safety and fluid tightness under all conditions.

According to the invention, this aim is achieved by a connecting kit and a product feed unit, comprising the technical features described in one or more of the appended claims.

BRIEF DESCRIPTION OF THE DRAWINGS

The technical features of the disclosure, with reference to the above aims, are clearly described in the claims below and its advantages are apparent from the detailed description which follows, with reference to the accompanying drawings which illustrate a preferred, non-limiting example embodiment, and in which:

FIG. 2 is a schematic view of a feed unit according to this invention;

FIG. 3 is a schematic cross section, through the cross section plane III-Ill, of a detail of the connecting kit of the feed unit of this invention, shown in FIG. 2;

FIG. 4 schematically illustrates a detail H of the connecting kit of the feed unit of this invention, shown in FIG. 3;

DESCRIPTION OF THE PREFERRED EMBODIMENTS

Figure 1:
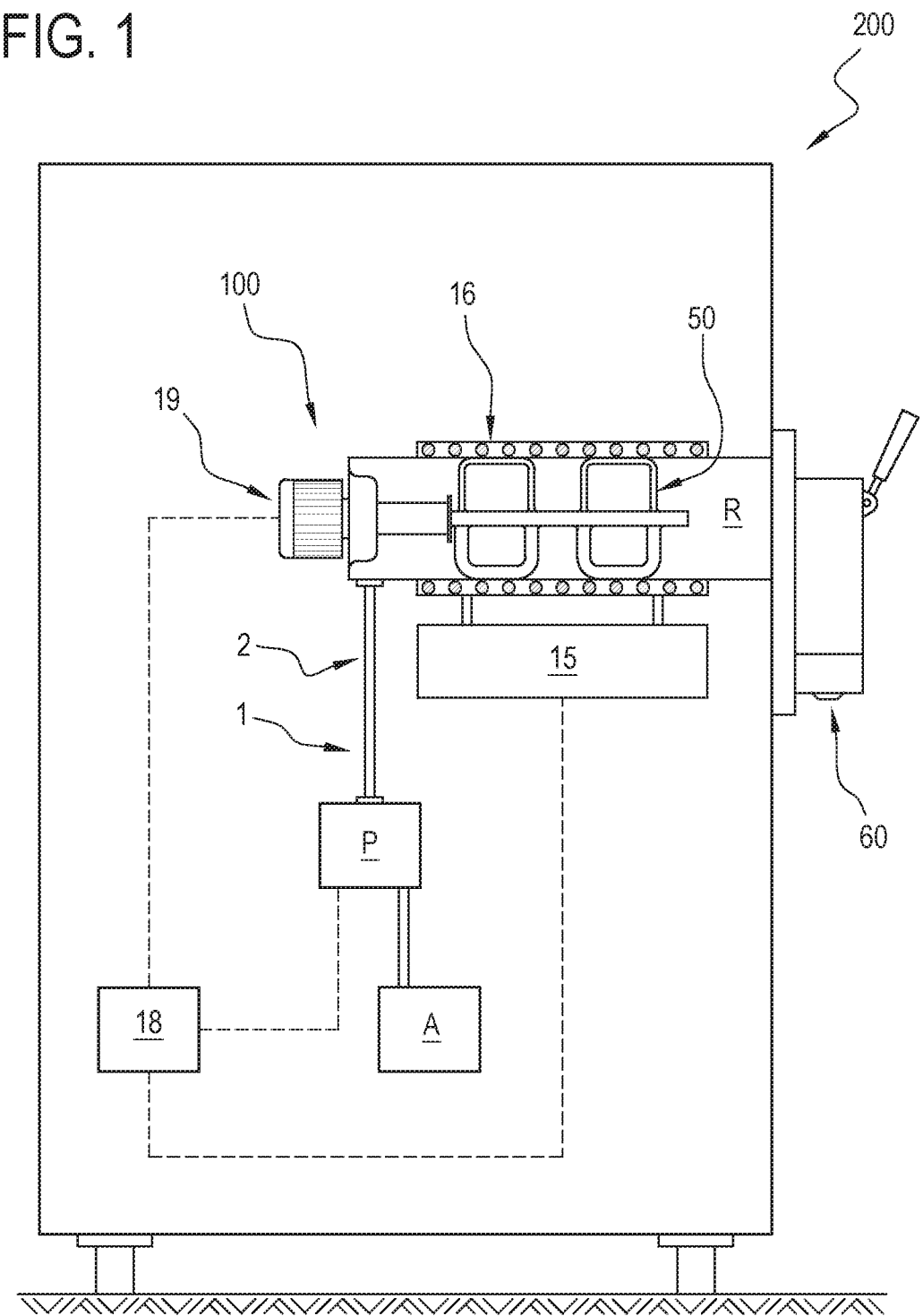
FIG. 1 is a schematic view of a machine comprising the feed unit according to this invention.
Figure 6:
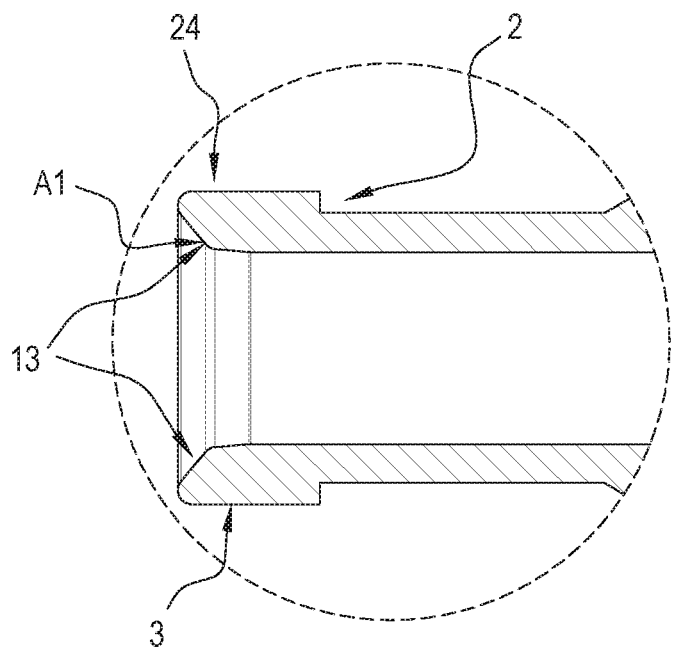
FIG. 6 schematically illustrates a detail K of the connecting kit of the feed unit of FIG. 5.
Figure 5:
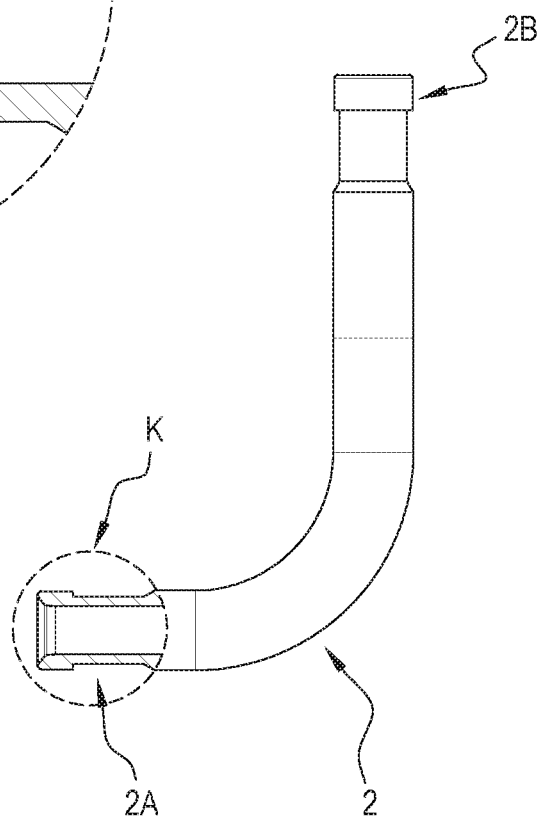
FIG. 5 schematically illustrates a detail of the connecting kit of the feed unit of the preceding figures.

With reference to the accompanying drawings, the numeral 200 denotes a machine for making liquid or semi-liquid products of the ice cream and/or bakery and confectionery and/or catering sector.

It should be noted that the machine 200 is preferably designed to make ice cream, bakery and confectionery creams or catering food products.

By products of the ice cream or bakery and confectionery or catering sector are meant products such as ice cream, (soft ice cream, artisan gelato, sorbets, slushes, etc.) and products such as custard and chocolate creams or savory soups.

These products are products which may be served hot or cold.

Preferably, but not necessarily, the machine 1 is an ice cream machine, designed to make ice cream (preferably artisan gelato).

In the context of the invention, the term "ice cream" is used to mean a food preparation which is based on milk or milk-derived products and to which fruit, aromatics or other ingredients are added to obtain different flavors.

The machine 200 comprises:

a processing container R (defining a processing chamber);

a stirrer 50 mounted inside the feed container R (not illustrated and schematically indicated in the accompanying drawings);

a thermal treatment system 15 (preferably but not necessarily, for cooling), provided with at least one heat exchanger 16 associated with the processing container R, for exchanging heat;

a device P for feeding a liquid or semi-liquid food product;

a kit 1 (being the object of this invention, described in more detail below) for connecting to the processing container R a device P for feeding a liquid or semi-liquid food product.

It should be noted that the device P for feeding a liquid or semi-liquid food product, the processing container R and the connecting kit 1 constitute in their entirety a feed unit 100 according to the invention.

The kit 1 for connecting to the processing container R a device P for feeding a liquid or semi-liquid food product, constituting the object of this invention, comprises at least:

an internally hollow pipe 2 (preferably of plastic material and still more preferably, of PTFE) having a first end 2A and a second end 2B, where at least one between the first and the second end (2A, 2B) comprises an enlarged, external terminal portion 3;

a receiving element 5 (or receiving flange 5) provided with a hole 7 for receiving the enlarged, external terminal portion 3 at one end (2A, 2B) of the pipe 2 and with an abutment 6 for stopping the end (2A, 2B) of the pipe 2 inside the hole 7;

means 80 for pushing and locking the enlarged, external terminal portion 3 at the end (2A, 2B) inside the receiving hole 7 in order to allow locking the enlarged, external terminal portion 3 against the abutment 6.

In a preferred embodiment, the means 80 for pushing and locking the enlarged, external terminal portion 3 at the end (2A, 2B) comprise:

a coupling bush 4 shaped to be inserted, in use, into the receiving hole 7 and externally of the pipe 2;

means 8 for pushing and locking the coupling bush 4 when it is positioned inside the receiving hole 7 so as to push the coupling bush 4 against the enlarged, external terminal portion 3 at the end (2A, 2B) of the pipe 2 when it is inserted inside the receiving hole 7.

In a preferred embodiment, the means 8 for pushing and locking the coupling bush 4 comprise an internally hollow locking element 9 having a portion 11 which is shaped to be coupled to the receiving element 5 and also having a portion 12 for pushing and butting against the coupling bush 4.

According to one aspect, the receiving element 5 comprises a threaded portion 10, the locking element 9 being a ring nut and the portion 11 being threaded and shaped to be coupled with the threaded portion 10 formed in the receiving element 5.

Figure 7:
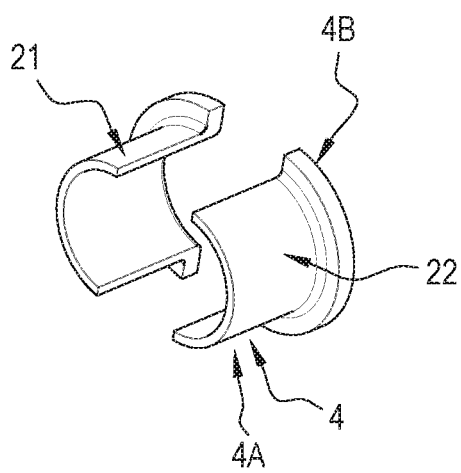
FIG. 7 shows a schematic perspective view of a detail of the connecting kit of the preceding figures.

With reference to the coupling bush 4, it should be noted that it is preferably made up of two parts designed to be coupled to each other: a first part 21 and a second part 22 (as illustrated in FIG. 7).

It should be noted that the receiving element 5 is preferably associated (directly in communication) with the processing container R or with the device P for feeding a liquid or semi-liquid food product.

Figure 8:
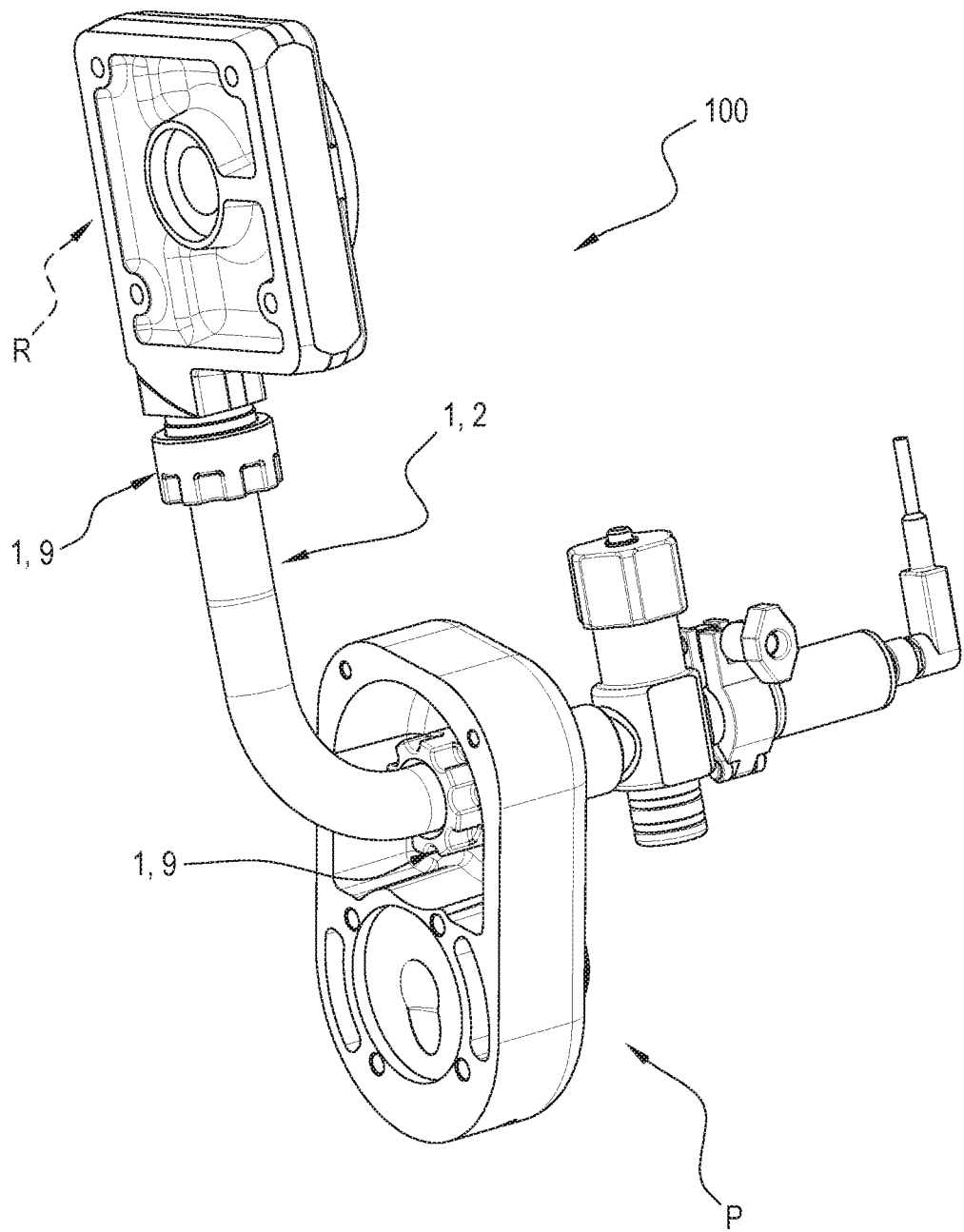
FIG. 8 shows a perspective view of the feed unit of FIG. 2.

FIG. 8 illustrates a rear portion of the processing container R.

It should be noted that the processing container R may be a cylindrical container or a tub.

Thus, the hole 7 of the receiving element 5 is (or may be placed) in communication) with the processing container R or with the device P for feeding a liquid or semi-liquid food product.

More precisely, it should be noted that the receiving element or flange 5 comprises a protruding portion P1 inside which the hole 7 is made.

The threaded portion 10 is made on the outside of the protruding portion P1.

The locking element 9 has a first (axial) portion P2 which is (radially) narrow and a second (axial) portion P3 which is (radially) widened.

Both portions (P2, P3) of the locking element 9 are internally hollow to allow the pipe 2 to pass through them.

More generally speaking, the locking element 9 is internally hollow to allow the pipe 2 to pass through it.

The threaded portion 11 is formed (internally, that is, in the cavity) at the second, widened portion P3.

The narrow portion P2 defines, along the axial direction of extension X of the ring nut, the abutment portion 12 for the bush 4.

More specifically, the abutment portion 12 for the bush 4 is defined at a transition region between the first portion P2 and the second portion P3.

It should be noted that, in use, the ring nut 9 is locked (by screwing) to the receiving element 5.

According to another aspect, the pipe 2 comprises a tapered portion 13 at its first end 2A and/or at its second end 2B.

The tapered portion 13 converges towards the inside of the pipe 2.

More precisely, the tapered portion 13 is defined externally (that is, away from the axis) by a line parallel to the axis and internally by an inclined line, making an acute angle α with each other.

The abutment 6 for stopping the end (2A, 2B) of the pipe 2 is defined by a narrowing portion 14 of the hole 7.

According to another aspect, the narrowing portion 14 of the hole 7 is defined by a wedge-shaped or tapered annular region.

According to another aspect, the narrowing portion 14 of the hole 7 is shaped to abut and receive the tapered portion 13 of the pipe 2.

According to another aspect, the narrowing portion 14 of the hole 7 is defined internally (that is, towards the axis of the hole 7) by a line parallel to the axis of the hole 7 and externally (that is, away from the axis of the hole 7) by an inclined line, making an acute angle β with each other.

Preferably, as illustrated in FIG. 3 and in FIG. 7, the bush 4 has a portion 4A which, in use, is adapted to butt against a portion of the pipe 2 and to butt against the enlarged, external terminal portion 3 at the first end 2A or at the second end 2B and a flange portion 4B affected by the locking means 8.

More precisely, it should be noted that the locking element 9 butts against the flange portion 4B of the bush 4.

More precisely, in use, the abutment portion 12 of the locking element 9 butts (longitudinally) against the flange portion 4B of the bush 4.

As is evident from FIG. 3 and FIG. 7, the bush 4, in use, comes into abutment (longitudinally) against the enlarged portion 3 of the pipe 2, in such a way that the pipe 2, specifically the tapered portion 13, stops against the abutment 6 (that is, the narrow portion 14 of the hole 7).

According to another aspect, the pipe 2 comprises, at its first end 2A and/or at its second end 2B, a portion 13 which is tapered by a first taper angle α and the abutment 6 for stopping the end (2A, 2B) of the pipe 2 is defined by a narrowing portion 14 of the hole 7 which is tapered by a second taper angle β.

Preferably, the first taper angle α is greater than the second taper angle β.

More precisely, experimental studies conducted by the applicant have shown that because the first taper angle α is greater than the second taper angle β, the seal is created in particular in the region labelled A1, that is in the abutment zone between the tapered portion 13 and the narrowing portion 14 closest to the axis of the hole 7.

It should also be noted that because the first taper angle α is greater than the second taper angle β, the contact pressure between the tapered portion 13 of the pipe 2 and the abutment 6 of the receiving element 5 increases radially towards the axis of the hole 7.

That way, an optimum, durable seal is created.

More specifically, the pipe 2 is made of deformable material, so that the tapered portion 13 of the pipe is, in use, subjected to the pushing and locking means 80 which cause it to be deformed to obtain the correct sealing action.

Preferably, the second taper angle β is between 35° and 60° and the first taper angle α is between 1° and 15° greater than the second taper angle β.

Preferably, the second taper angle β is between 35° and 60° and the first taper angle α is between 2° and 10° greater than the second taper angle β.

It should be noted that the invention advantageously allows creating an effective seal between the pipe 2 and the flange 5 thanks to the butting action and contact between the terminal portion 3 and the abutment 6, preventing the product from leaking out.

It should be noted that the tapered, or conical, shape both of the abutment 6 (or narrowing portion 14) and of the terminal portion 13 of the pipe 2 is such as to guarantee an effective sealed coupling between the pipe 2 and the element 5 without any need for a gasket.

Preferably, the feed device P comprises a pump (of any kind).

Alternatively, the feed device P may comprise a tank or tub adapted to feed liquid to the container R by gravity.

According to another aspect, the feed unit 100 comprises a container A adapted to contain the liquid or semi-liquid food product and connected to the feed device P to allow the feed device P to draw the liquid or semi-liquid food product from the container A itself.

The container A, illustrated schematically in FIG. 1, may be removable or it may be a fixed container (for example, a tub).

According to another aspect, the feed unit comprises, for each feed device P and processing container R, a receiving element 5, a coupling bush 4, and means 8 for locking the coupling bush 4 inside the receiving hole 7 using the kit 1 described above and wherein the pipe 2 comprises an enlarged, external terminal portion 3 at the first end 2A and an enlarged, external terminal portion 3 at the second end 2B.

Described below are some aspects of the machine 200, which also forms an object of this invention.

Preferably, the machine 200 also comprises serving means 60 (for serving the finished product), operating at the container R for delivering the (finished) product to the outside of the container R.

With reference to the serving means 60 (for serving the finished product), it should be noted that these may be operated manually or automatically.

It should be noted that the stirrer 50 is adapted to be driven in rotation to allow mixing the basic product (transferred from the capsule into the processing chamber 4) with the dilution liquid inside the processing chamber 4.

Preferably, the machine 1 comprises an actuator 19 (drive motor) to drive the stirrer 50 in rotation.

Preferably, the heat exchanger 16 is wound in a coil on the walls of the (cylindrical) container R.

Preferably, the processing container R is provided with a (side) door for cleaning, and/or extracting the product therefrom.

The mixing and (simultaneous) thermal (cooling) treatment step is carried out inside the processing container R so as to convert the basic preparation, diluted with the dilution liquid, into the finished product (for example, an ice cream type product).

It should be noted that during the stirring and simultaneous thermal treatment step, the basic preparation P (diluted with the dilution liquid) is preferably thermally treated (in particular in the case of an ice cream type product) at a temperature between −15° C. and −2° C.

Thus, the thermal treatment (cooling) means 15 are preferably configured to cool the basic preparation P (diluted with the dilution liquid) inside the container R down to a temperature between −15° C. and −2° C. and, more preferably, between −13° C. and −3° C.

Thus, according to what is described in the foregoing, the control and drive unit 18 forming part of the machine 200 is configured to regulate the thermal treatment (cooling) means 15 in such a way as to enable the mixture being processed inside the container R to be cooled to a temperature in a range between −15° C. and −2° C. and, more preferably, between −13° C. and −3° C.

It should be noted that the thermal treatment (cooling) means 15 preferably comprise a compressor and a hydraulic circuit (which the compressor is connected to) containing a heat exchanger fluid.

The heat exchanger 16 associated with the container R is configured to allow heat exchange between the heat exchanger fluid and the basic preparation P (diluted with the dilution liquid) inside the container R.

It should be noted that preferably the heat exchanger 16 associated with the container R, in cooling during normal use, acts as an evaporator.

Preferably, the thermal treatment (cooling) means 15 comprise a further exchanger (condenser), not illustrated.

Preferably, the thermal treatment (cooling) means 15 are configured to operate according to a thermodynamic cycle, preferably a vapor compression cycle.

It should be noted that FIG. 8 does not show the container R in full but only its closing wall.

What is claimed is:

1. A kit for connecting to a processing container a device for feeding a liquid or semi-liquid food product, comprising:
    an internally hollow pipe having a first end and a second end, wherein at least one chosen from the first end and the second end comprises an enlarged, external terminal portion;
    a receiving element including a receiving hole for receiving the enlarged, external terminal portion and an abutment for stopping the at least one chosen from the first end and the second end of the pipe inside the receiving hole;
    a pushing device for pushing and locking the enlarged, external terminal portion inside the receiving hole to lock the at least one chosen from the first end and the second end inside the receiving hole against the abutment;
    wherein the pipe comprises, at the at least one chosen from the first end and the second end, a tapered portion which is tapered by a first taper angle, and the abutment includes a narrowing portion of the receiving hole which is tapered by a second taper angle, the narrowing portion configured for engaging the tapered portion;
    wherein the first taper angle is greater than the second taper angle;
    wherein the pushing device comprises:
        a coupling bush shaped to be inserted, in use, into the receiving hole and externally of the pipe;
        a pushing surface for pushing and locking the coupling bush when the coupling bush is positioned inside the receiving hole so as to push the coupling bush against the enlarged, external terminal portion when the pipe is inserted inside the receiving hole.

2. The kit according to claim 1, wherein the pushing device comprises an internally hollow locking element having a portion which is shaped to be coupled to the receiving element and the pushing surface.

3. The kit according to claim 2, wherein the receiving element comprises a threaded portion, the locking element is a ring nut threaded and shaped to be coupled with the threaded portion of the receiving element.

4. The kit according to claim 1, wherein the second taper angle is between 35° and 60° and the first taper angle is greater than the second taper angle by a value between 1° and 15°.

5. The kit according to claim 4, wherein the first taper angle is greater than the second taper angle by a value between 2° and 10°.

6. The kit according to claim 1, wherein the coupling includes a first portion which, in use, is adapted to receive a portion of the pipe and to butt against the enlarged, external terminal portion and a flange portion configured for engaging the pushing surface.

7. A feed unit for feeding a liquid or semi-liquid food product, comprising:

a feed device for feeding the liquid or semi-liquid food product;
a processing container;
the kit according to claim 1.

8. The feed unit according to claim 7, wherein the feed device comprises a pump.

9. The feed unit according to claim 7, and further comprising a supply container adapted to contain the liquid or semi-liquid food product and connected to the feed device to allow the feed device to draw the liquid or semi-liquid food product from the supply container.

10. The feed unit according to claim 7, and further comprising, for each of the feed device and the processing container, one of the receiving elements, one of the pushing devices including one of the coupling bushes and one of the pushing surfaces, and wherein the pipe comprises one of the enlarged, external terminal portions at each of the first end and the second end.

11. A machine for making liquid and/or semi-liquid products for the ice cream, bakery and confectionery or catering trade, comprising:
the feed unit according to claim 7;
a stirrer mounted inside the processing container;
a motor configured to drive the stirrer in rotation;
a thermal treatment system including at least one heat exchanger thermally connected with the processing container, for exchanging heat with the processing container and cooling the processing container;
a controller for driving and controlling the thermal treatment system and the motor.

12. The machine according to claim 11, wherein the narrowing portion radially overlaps the tapered portion to form an abutment zone, and the first taper angle being greater than the second taper angle causes the engagement between the narrowing portion and the tapered portion to be at a portion of the abutment zone closest radially to an axis of the receiving hole.

13. The feed unit according to claim 7, wherein the narrowing portion radially overlaps the tapered portion to form an abutment zone, and the first taper angle being greater than the second taper angle causes the engagement between the narrowing portion and the tapered portion to be at a portion of the abutment zone closest radially to an axis of the receiving hole.

14. The kit according to claim 1, wherein the narrowing portion radially overlaps the tapered portion to form an abutment zone, and the first taper angle being greater than the second taper angle causes the engagement between the narrowing portion and the tapered portion to be at a portion of the abutment zone closest radially to an axis of the receiving hole.

15. A feed unit for feeding a liquid or semi-liquid food product, comprising:
a feed device for feeding the liquid or semi-liquid food product;
a processing container;
a kit configured for connecting the feed device to the processing container, the kit comprising:
an internally hollow pipe having a first end and a second end, wherein at least one chosen from the first end and the second end comprises an enlarged, external terminal portion;
a receiving element including a receiving hole for receiving the enlarged, external terminal portion and an abutment for stopping the at least one chosen from the first end and the second end of the pipe inside the receiving hole;
a pushing device for pushing and locking the enlarged, external terminal portion inside the receiving hole to lock the at least one chosen from the first end and the second end inside the receiving hole against the abutment, wherein the pushing device comprises:
a coupling bush shaped to be inserted, in use, into the receiving hole and externally of the pipe;
a pushing surface for pushing and locking the coupling bush when the coupling bush is positioned inside the receiving hole so as to push the coupling bush against the enlarged, external terminal portion when the pipe is inserted inside the receiving hole,
for each of the feed device and the processing container, one of the receiving elements, one of the pushing devices including one of the coupling bushes and one of the pushing surfaces, and wherein the pipe comprises one of the enlarged, external terminal portions at each of the first end and the second end.

* * * * *